F. F. Smith,
Making Plow Plates,
No 1,705. Reissued June 21, 1864.
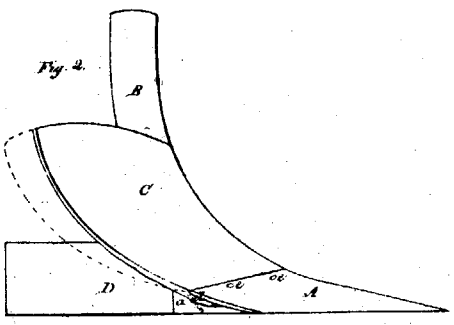
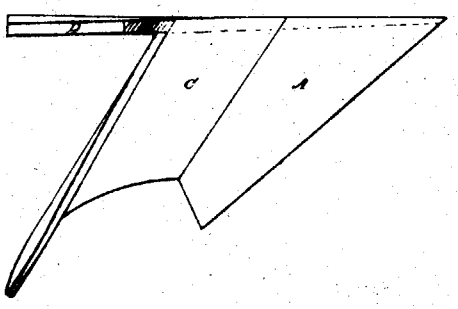
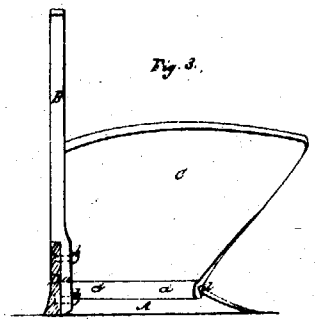
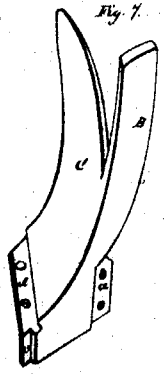
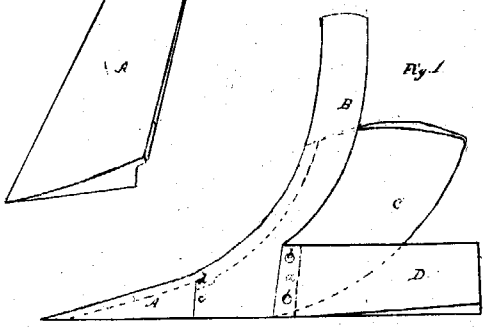
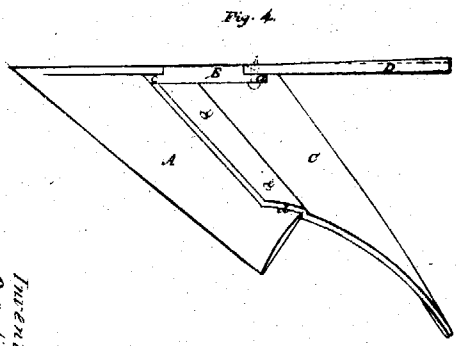
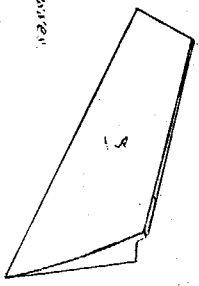
Witnesses.
J. W. Crosby
R. S. Spencer
Inventor.
F. F. Smith.
per Munn & Co
attorneys.

UNITED STATES PATENT OFFICE.

F. F. SMITH, OF COLLINSVILLE, CONNECTICUT, ASSIGNOR TO THE COLLINS COMPANY, OF SAME PLACE.

IMPROVEMENT IN THE MODE OF CASTING PLOW-PLATES.

Specification forming part of Letters Patent No. 30,691, dated November 20, 1860; Reissue No. 1,705, dated June 21, 1864.

*To all whom it may concern:*

Be it known that I, F. F. SMITH, formerly of Momence, in the county of Kankakee and State of Illinois, but now of Collinsville, in the county of Hartford and State of Connecticut, have invented a new and useful Improvement in Steel Plows; and I do hereby declare that the following is a full, clear, and exact description of the same, reference being had to the accompanying drawings, forming a part of this specification, in which—

Figures 1 and 2 represent opposite side views of the plow. Fig. 3 represents a rear view of the same. Fig. 4 represents a view of the bottom of the plow. Fig. 5 represents a top view of the same. Fig. 6 represents a perspective view of the share separate from the other parts, and Fig. 7 represents a perspective view of the casting constituting the mold-board and standard.

Heretofore steel plows have been made of plate or rolled steel, worked into shape by bending, welding, and other forging operations, and owing to the difficulties which present themselves in this mode of manufacturing them have had many serious defects, among which is that of making the different parts of nearly uniform thickness, while the wear is much greater upon some portions of the plow than upon other portions, and thus some portions may be worn out before other portions are scarcely polished by use. Another defect in this plan arises from the difficulty of fashioning the parts to the exact shape desired, inasmuch as they are shaped by hand. No system of dies has been found suitable for shaping these steel plow-plates that I know of.

My invention consists in the process of manufacturing a plow—that is to say, those parts of a plow commonly made of steel, viz., the share, the landside, and the mold-board—by pouring the steel in a molten state into molds of the required shape, and opening or loosening up the mold before the molten metal chills, to relieve the casting or plow-plate and prevent it from cracking by shrinkage in cooling.

In the manufacture of the molded-steel plow, I propose, for the sake of greater convenience in casting, as well as of insuring a greater solidity of the metal and freedom from "honeycombing," to make it of two or more pieces or castings. The accompanying drawings represent a plow, the share A of which is of one casting, its mold-board B and standard C of another, and its landside D of a third piece or casting. The casting B C is made with a flange, *a*, at the foot and back of the standard for the attachment of the landside D by rivets or bolts *b b*, countersunk on the outside of the landside, said flange being thrown back under the mold-board, as shown in Figs. 3 and 4, to enable the landside to be brought flush with the standard and corresponding edge of the share. The casting B C is also made with a flange, *c*, of similar character to *a* in front of the standard, and has a rabbet, *d*, Figs. 2, 3, and 4, formed along its front or lower edge that the back or upper edge of the share may lap over it in such manner that the faces of the mold-board and share come together with a flush-joint. The share is secured by rivets or bolts *e e* passing through the rabbet *d* and countersunk on the outside. Each casting is made by pouring the molten steel from a crucible or other vessel into a mold whose cavity is of the desired form. I prepare the mold for the plow in any of the well-known ways, but prefer metal molds, and of the metals find cast-iron to answer a good purpose. In the construction of the molds I only deem it necessary to state that the tube formed for the reception of the molten steel, and its conveyance to the cavity of the mold should be so arranged that the steel will not strike upon the interior surface of the cavity, but will flow into it from one side, for in striking upon any portion of the interior surface it will cut or melt away that portion and render the mold worthless after one or two castings have been made; and, secondly, that the ventilation of the mold should be made by extremely narrow openings which will prevent the steel from escaping, but yet permit the confined air to escape. These openings I make by placing pieces of thin hoop-iron between the joints of the mold, or by making very shallow grooves in the faces of the joints.

It is necessary as soon as the steel is poured into the molds, and before the metal has cooled enough to contract to any extent, to open the molds and detach the casting therefrom, because if not detached before the shrinkage takes place the plate is apt to crack. The flanges and undercut parts of the plates, too, cling to the parts of the molds where they receive their peculiar forms, and, not being able to shrink in all directions in cooling, require the utmost care in freeing the casting from the mold. The molds themselves when of iron cannot yield to compensate for shrinkage, and hence I open the molds as soon as the metal is poured into them.

The clamps for securing the molds should be so made and united as to be readily detached, as the utmost expedition must be had in raising the molds to relieve the plate or casting.

The steel used may be that of commerce, and in case of its being of a "high quality," it may be reduced by mixing with it a portion of iron. To determine when the steel is sufficiently limped or fluid to pour into the molds, a rod of iron may be inserted in the molten steel, and by the quantity of steel that adheres to the rod its fluidity may be correctly ascertained. The smaller the quantity of steel that adheres to the rod the more suitable is its condition for being poured into the molds. It will thus be seen from the nicety with which each and every operation must be watched and attended to that the casting of steel plates for plows which have varied forms and generally varied thicknesses is entirely different from that of casting iron in molds. The contour of the mold gives the form to the plow-plate, and this form may be varied to suit the fashion of the plows to be made, or the particular parts thereof that are to be made of steel.

What I claim as my invention, and desire to secure by Letters Patent, is—

In connection with the making of cast-steel plow-plates in molds, the opening or loosening up of the mold before the molten metal chills enough to shrink to any extent for the purpose of relieving the plate or casting, and to prevent it from cracking by the shrinkage of the cast cast-steel in cooling, substantially as herein described.

F. F. SMITH.

Witnesses:
A. B. STOUGHTON,
EDM. F. BROWN.